US00H002078H

(19) United States

(12) Statutory Invention Registration (10) Reg. No.: US H2078 H

Wehrle et al. (43) Published: Sep. 2, 2003

(54) PERMANENT BONDING OF CORROSION RESISTING METALLIC PARTS BY SEALANT ATTACHMENT

(75) Inventors: John P. Wehrle, Greenbelt, MD (US); Albert G. Holder, Baltimore, MD (US)

(73) Assignee: The United States of America as represented by the Secretary of the Navy, Washington, DC (US)

(21) Appl. No.: 09/428,451

(22) Filed: Oct. 28, 1999

(51) Int. Cl.[7] ..... B32B 31/06; B63B 3/48

(52) U.S. Cl. ..... 156/92; 114/85

(58) Field of Search ..... 156/71, 91, 92; 114/65 R, 85

(56) References Cited

U.S. PATENT DOCUMENTS 2,140,672 A * 12/1938 Gray et al. ..... 156/92
3,139,364 A * 6/1964 Fiechter ..... 156/91
4,575,578 A 3/1986 Bogan et al.
4,913,447 A 4/1990 Jostlein
4,925,510 A * 5/1990 Hojo et al. ..... 156/92
4,980,005 A * 12/1990 Scollard ..... 156/92
5,791,654 A 8/1998 Gaines et al.
5,895,058 A 4/1999 Sanders
5,968,662 A * 10/1999 Morishige et al. ..... 428/458

* cited by examiner

*Primary Examiner*—Harold J. Tudor
(74) *Attorney, Agent, or Firm*—Jacob Shuster

(57) ABSTRACT

A sealant in its liquid phase is placed between attachment portions of paint coated metallic parts for subsequent in-place solidification into a gasket for both sealing and permanent bonding purposes. The attachment portions are then interconnected by screws extending through the gasket to increase its bonding strength.

5 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

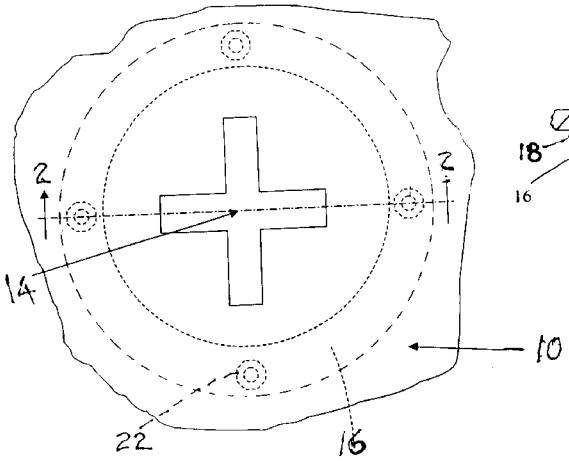
FIG.1
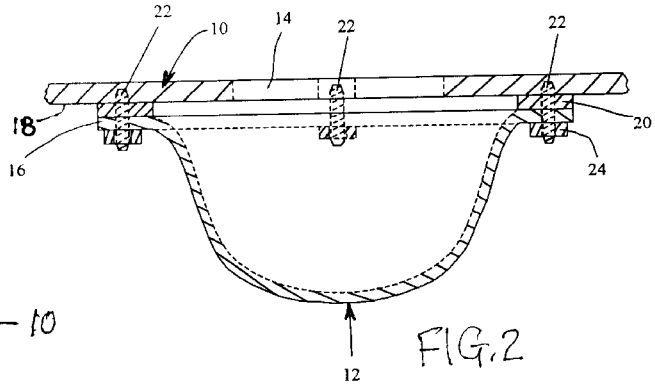
FIG.2
FIG.3
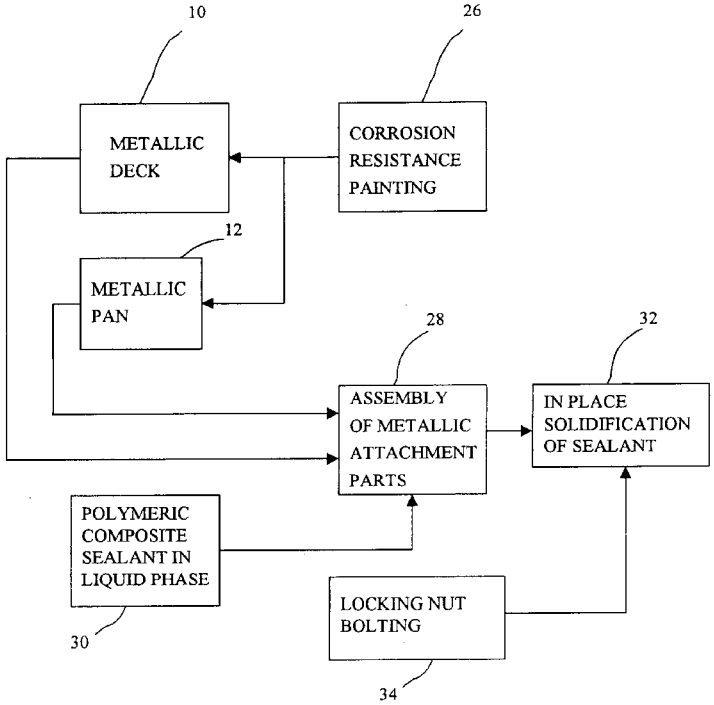

PERMANENT BONDING OF CORROSION RESISTING METALLIC PARTS BY SEALANT ATTACHMENT

The present invention relates generally to improved water-tight attachment of metallic parts without removal of the corrosion resistance property of coatings associated therewith.

BACKGROUND OF THE INVENTION

In connection with the attachment of a metal pan to the underside of the metal deck of a ship or the like, currently utilized welding methods which generate heat thereby destroy much of the corrosion resisting property of the paint coating on the deck underside adjacent to the cleave opening location at which a metal pan is attached to the deck. It is therefore an important object of the present invention to provide an attachment process or method, of minimized duration, which will avoid destruction or removal of the corrosion resisting property of paint coatings on marine vessel decks, necessary for protection thereof in seawater environment.

In regard to other environments, the attachment of metallic parts which involve physical interconnection by screw fasteners extending through sealing gaskets between such parts are generally known. Such gaskets are positioned as solid sealants between the parts to perform their exclusive sealing function while accommodating separation of the parts upon removal of the screw fasteners. It is therefore another object of the present invention to provide a sealing gasket which also performs a perrnanent bonding function during attachment between the metallic parts.

SUMMARY OF THE INVENTION

In accordance with the present invention, metallic parts, surface coated with a corrosion resisting paint, undergo attachment to each other for use in a corrosion inducing environment, such as a marine vessel in seawater. The attachment process therefore involves use of a gasket for both sealing and permanently bonding the metallic parts to each other without adversely affecting the corrsion resisting property of surface coating paint adjacent to the attachment locations. The gasket is formed from a polymeric composite material having the requisite sealing and bonding properties as well as accommodating relatively rapid solidification from a liquid phase under normal temperature conditions. Such gasket material in the liquid phase is placed in position between the attachment portions of the assembled metallic parts for in-place solidification into a sealant while establishing permanent bonding between the metallic parts without adversely affecting the corrosion resisting property of the surface coating paint, as in the case of welding. Following such in-place solidification of the gasket material, the metallic parts are physically interconnected by lock nut bolting involving extension of screw fasteners through the solidified gasket to provide for an increase in the permanent bonding strength of such gasket.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein:

FIG. 1 is a top plan view of a portion of a metal deck on a marine vessel, at a location thereon at which a metallic pan is attached therebelow.

FIG. 2 is a partial section view taken substantially through a plane indicated by section line 2—2 in FIG. l; and FIG. 3 is a block diagram summarizing the attachment method or process associated with the deck and pan assembly illustrated in FIGS. 1 and 2.

DETAILED DESCRIPTION OF PREFERRED EMBODIMENT

Referring now to the drawing in detail, FIGS. 1 and 2 illustrate metallic parts in the form of a steel deck 10 of a marine vessel and a metal pan 12 attached to the underside of the deck 10 in surrounding relation to a cleave opening 14 formed therein. The exterior surfaces of such metallic parts 10 and 12 are painted with corrosion resisting coatings for protection of the deck from seawater corrosion and to water proof the pan prior to attachment of the pan 12 to the deck 10 in accordance with the present invention.

As shown in FIG. 2, the pan 12 has an annular attachment flange 16 spaced from the painted undersurface 18 of the deck 10 by a solidified sealant gasket 20. Such sealant gasket 20 also forms a permanent attachment bond between the deck and pan by virtue of the properties of its composite elasto-ceramic polymeric composition, such as the commercially available product "Flexclad Duratough DL" produced and marketed by the Enecon Corporation of Bethpage, N.Y. The sealant material of the gasket 20 is applied in a liquid state between the flange 16 of the pan 12 and the underside 18 of the deck 10 at the attachment location for subsequent in-place solidification of the gasket material in less than 30 minutes in order to establish it as a permanent bond between the attachment portions of the metallic parts.

In order to provide for additional bonding strength under increased loading, exerted for example when the pan 12 becomes filled with water, a plurality of screw fasteners 22 are inserted through the sealant gasket 20 between the flange 16 and deck 10. In the embodiment shown in FIGS. 1 and 2, four (4) of such screws 22 are utilized, respectively threaded into the deck 10 and locked in position by nuts 24 in engagement with the attachment flange 16 to physically interconnect the attachment parts 10 and 12.

The attachment process hereinbefore described is summarized in FIG. 3. The metallic parts l0 and 12 as diagrammed, are initially coated with a corrosion resisting paint as demoted by reference numeral 26 before assembly 28. Such assembly 28 includes placement of the polymeric composite sealant in its liquid phase, as denoted by reference numeral 30 in FIG. 3. The sealant then undergoes in-place solidification 32 to from the sealing gasket through which permanent bonding between the metallic attachment parts is also established. Finally, lock nut bolting 34 of the permanently bonded metallic attachment parts is performed by insertion of the fastener screws 22 as hereinbefore described to provide for additional bonding strength.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a step of providing metallic parts coated with a paint having a corrosion resisting property, a method of attaching said metallic parts to each other in assembled relation with a sealant therebetween having selected properties, comprising the steps of: placing said sealant in a liquid phase between the coated metallic parts for in-place solidification thereof to establish permanent bonding between the coated metallic parts in said assembled relation without adversely affecting the corrosion resisting property of the paint because of said selected properties; and physically interconnecting the metallic parts by threadedly inserting screw fasteners into the metallic parts through the seal and after said solidification thereof to increase in strength said permanent bonding already established by the sealant.

2. The method as defined in claim wherein said sealant has a composite polymeric composition.

3. The method as defined in claim 2, wherein said metallic parts are respectively a marine vessel deck and a waterproof pan having an attachment flange to which placement of the sealant is confined.

4. In combination with the method as defined in claim 1, wherein said metallic parts are respectively a marine vessel deck and a waterproof pan having an attachment flange to which placement of the sealant is confined.

5. A method of attaching metallic parts in assembled relation to each other, comprising the steps of: placing sealant in a liquid phase between confronting surfaces of the metallic parts for in-place solidification of the sealant through which permanent bonding between the metallic parts in said assembled relation is established; physically interconnecting the metallic parts after said solidification of the sealant by insertion of fasteners therethrough to increase in strength said permanent bonding by the sealant; and placing a coating having a corrosion resisting property on said confronting surfaces of the metallic parts subsequently contacted by the sealant during said solidification thereof without any adverse affect on the corrosion resisting property of the coating.

* * * * *